US007634736B2

(12) United States Patent
Meek

(10) Patent No.: US 7,634,736 B2
(45) Date of Patent: Dec. 15, 2009

(54) DYNAMIC CONTROLLING ATTRIBUTE-SPECIFIC LIST FOR IMPROVED OBJECT ORGANIZATION

(75) Inventor: Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 10/799,456

(22) Filed: Mar. 12, 2004

(65) Prior Publication Data

US 2004/0177123 A1 Sep. 9, 2004

Related U.S. Application Data

(62) Division of application No. 09/681,045, filed on Dec. 1, 2000, now Pat. No. 6,732,155.

(51) Int. Cl.
*G06F 3/033* (2006.01)
(52) U.S. Cl. .................... 715/752; 709/200; 709/206; 709/207; 715/762; 715/764; 715/788; 715/789
(58) Field of Classification Search .............. 709/206, 709/207; 715/752, 751, 753, 762, 764, 788, 715/789
See application file for complete search history.

(56) References Cited

U.S. PATENT DOCUMENTS 5,613,108 A    3/1997  Morikawa

| 5,948,058 | A | 9/1999 | Kudoh et al. |
|---|---|---|---|
| 6,073,142 | A | 6/2000 | Geiger et al. |
| 6,463,462 | B1 | 10/2002 | Smith et al. |
| 2001/0042087 | A1 | 11/2001 | Kephart et al. |
| 2002/0069212 | A1 | 6/2002 | Leonardos |
| 2002/0080170 | A1 | 6/2002 | Goldberg et al. |
| 2004/0181581 | A1* | 9/2004 | Kosco ................. 709/206 |

OTHER PUBLICATIONS

Johann Eder, et al., Self-maintained Folder Hierarchies as Document Repositories, University of Klagenfurt, 2000, 8 pages.
Richard B. Segal, et al., Incremental Learning in SwiftFile, Proceedings of the Seventeenth International Conference on Machine Learning, 2000.

* cited by examiner

*Primary Examiner*—William L Bashore
*Assistant Examiner*—Meseker Takele
(74) *Attorney, Agent, or Firm*—Lee & Hayes, PLLC

(57) ABSTRACT

Improving object organization by presenting controlling attribute-specific lists is disclosed. For example, the object can be an email and the controlling attribute the sender of the email. Sender-specific lists are dynamically maintained and can include the most recent folders into which email have been moved. When a current email is selected, or when the user otherwise so indicates, a sender-specific list for the sender of the current email is displayed to the user. The user can select one of the folders from the list into which to move the current email. Besides email, the object can be a file, such that the controlling attribute can be the creator of the file.

40 Claims, 7 Drawing Sheets

DYNAMIC CONTROLLING ATTRIBUTE-SPECIFIC LIST FOR IMPROVED OBJECT ORGANIZATION

REFERENCE TO RELATED APPLICATION

This application is a divisional application of U.S. patent application Ser. No. 09/681,045, filed Dec. 1, 2000, now U.S. Pat. No. 6,732,155 entitled DYNAMIC CONTROLLING ATTRIBUTE-SPECIFIC LIST FOR IMPROVED OBJECT ORGANIZATION. The entirety of this application is incorporated herein by reference.

BACKGROUND OF THE INVENTION

The invention relates generally to organizing objects, such as email and files. More particularly, the invention relates to providing a list of actions that is specific to a controlling attribute and that is dynamically sorted according to a sort criterion. For example, the actions of the list can be movement of email into different folders. The controlling attribute can be the sender of a current email. The sort criterion can be the folders into which the user most recently moved email from this sender. A common complaint of computer users is colloquially known as "information overload." Users complain that they receive too much email, and generate too many computer files, such as word processing files, spreadsheet files, and other types of files. One of the primary reasons why too much information is a problem for users is that they have difficulty organizing the information in a way that enables them later to easily locate a particular piece of information. For example, with respect to email, users may often receive nearly one-hundred email messages or more a day. The organizational scheme to which many users default is to delete unwanted email, and keep other email in the in-box folder in which they originally appeared.

Current email computer programs usually provide users with the ability to organize email into a hierarchy of folders. For example, a user may create a series of folders by project name. Sub-folders within these folders may then be created for the phases of each project. However, even with this capability, many users choose not to manually sort email into folders, even though they know that doing so would allow them to subsequently retrieve desired information more quickly. When asked, many users indicate that they do not sort email into folders because of the amount of effort that is required both initially and on a continuing basis to create and maintain a cogent organizational folder scheme.

One recent innovation in some email computer programs has been the most-recently-moved-to (MRMT) list of folders. This list has a number of entries corresponding to folders into which the user has most recently moved email. The first entry of the list corresponds to the folder into which the user has most recently moved email, the second entry corresponds to the folder into which the user has second most recently moved email, and so on. If the user has in place some organizational folder scheme for email, email movement into these folders is more easily accomplished by using the MRMT list. Email is typically moved to some folders more often than to other folders. Using the MRMT list means that the user is able to select the folder into which to move email from a relatively short list of most likely intended folders, rather than from the list of all possible folders, which can be quite large.

However, the MRMT list is limited. In particular, the list implicitly assumes that the user is likely to move new email to a folder into which other email has been most recently moved. The list does not take into consideration, for instance, that some email is never likely to be moved into some folders. For example, a user may occasionally receive email from friends, which the user may want to save in one or more personal-specific folders. However, the user may have more recently received a flurry of business-related email that were moved to business-specific folders. The MRMT list in this situation would not include folders into which the user would want to move email subsequently received from a friend. This is because the business-specific folders would likely populate the list, such that it would not include any personal-specific folders.

In sum, the MRMT list is a first step towards solving the problem of information overload, but is by no means the final say in empowering users to easily organize their information for subsequent fast retrieval. The MRMT list is useful for what it does, but is limited in the benefits it provides to computer users. For these and other reasons, there is a need for the present invention.

SUMMARY OF INVENTION

The invention relates to improving object organization by presenting controlling attribute-specific lists. For example, the object can be an email, and the controlling attribute can be the sender of the email. Sender-specific lists of folders into which email have been moved are dynamically maintained. The lists are ordered based on a sort criterion, such as the most recent or most frequent folders into which email from the senders have been moved. When an email is moved, the list corresponding to the sender of the email is updated. A particular sender-specific list can be invoked to display the list to the user. For example, the user can press a button to show the list corresponding to the sender of the email that the user wants to move. As another example, the list corresponding to the sender of an email can be automatically shown when the email received is selected. The list may also be combined with a non-sender-specific list.

By displaying controlling attribute-specific lists, the invention provides users with relevant possible alternatives as to how an action can be performed relative to a given object. More specifically, with respect to email organized into folders, the invention providers users with relevant folders into which a given email may be moved. For example, email from a work colleague that are typically organized into business-related folders may yield a list of the most recent business-related folders into which email from the colleague have been moved.

As another example, email from a friend that are typically organized into personal-related folders may yield a list of the most recent personal-related folders into which email from the friend have been moved. Even if an email is received from the friend after a large number of email from the work colleague have been moved into business-related folders, the sender-specific list corresponding to the friend would still include only the personal-related folders. In this way, the user is provided a a more relevant list of folders into which to move the email from the friend. This list would not include the business-related folders, even though more recently other email may have been moved into them, because the user would have not recently moved prior email from the friend into these folders.

Besides the embodiments, aspects, and advantages described in the summary, other embodiments, aspects, and advantages of the invention will become apparent by reading the detailed description and by referencing the drawings.

DETAILED DESCRIPTION

In the following detailed description of exemplary embodiments of the invention, reference is made to the accompanying drawings that form a part hereof, and in which is shown byway of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention, The following detailed description is, therefore, not to be taken in a limiting sense, and the scope of the present invention is defined only by the appended claims.

Figure 1:
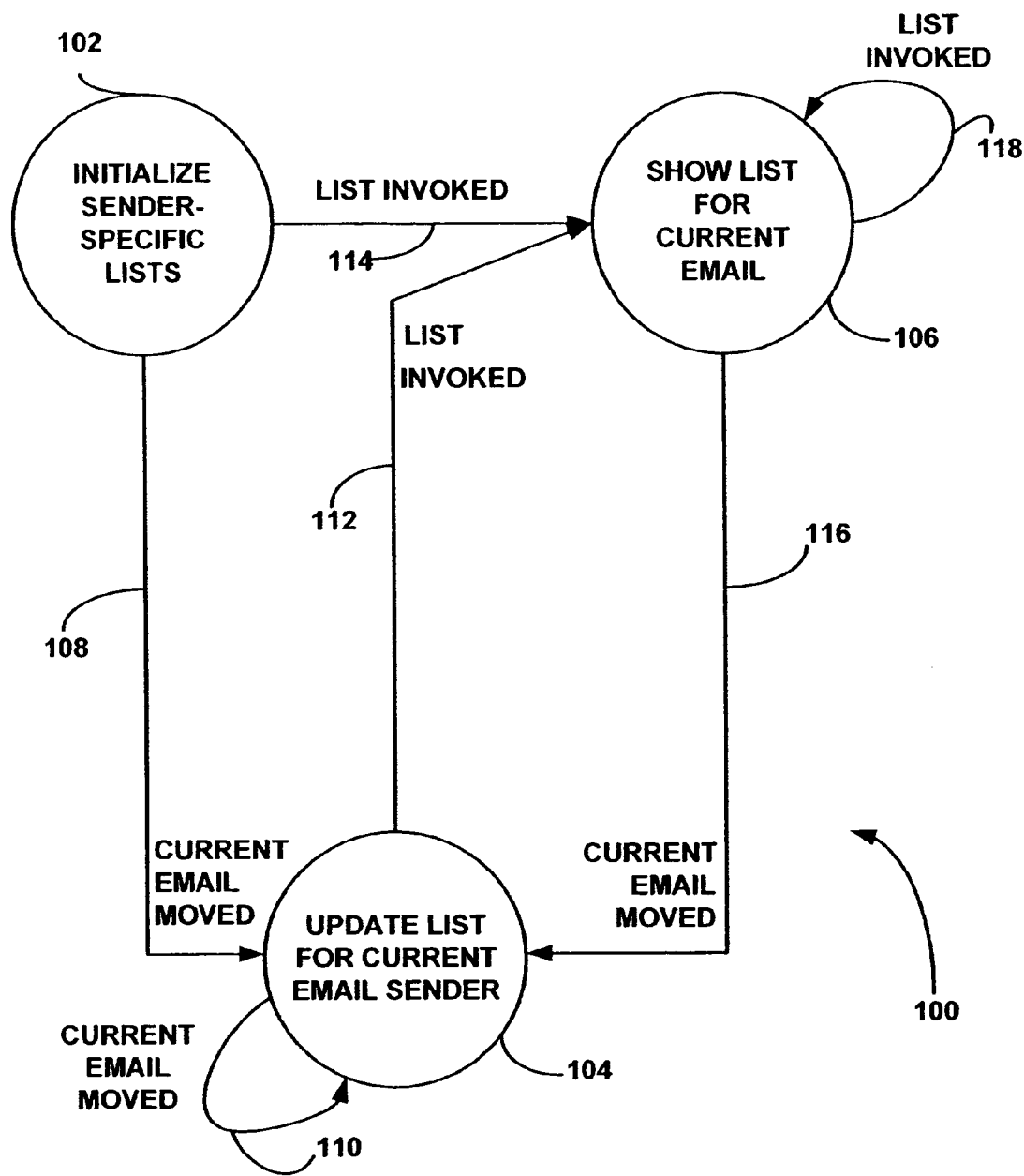
FIG. 1 is state-transition diagram showing how one embodiment of the invention operates.

Embodiment for Maintaining and Displaying Sender-Specific Lists of Folders for Email This embodiment relates to maintaining and displaying sender-specific lists of folders for email. Alternative embodiments that expand or otherwise modify this embodiment are described in subsequent sections of the detailed description. FIG. 1 shows a state diagram 100 of how this embodiment operates. The state diagram 100 has three states 102, 104, and 106. The state 102 is the initial state, in which the sender-specific lists of folders are initialized. The state 104 is the update state, in which one of the lists is updated based on movement of an email into a folder. The state 106 is the display state, in which one of the lists is displayed to the user. Generally, when a current email is moved to a folder, the update state 104 updates the list corresponding to the sender of the email. When a sender-specific list is invoked, the display state 106 displays this list. Each of the states 102, 104, and 106 is now described in more detail.

Figure 2:
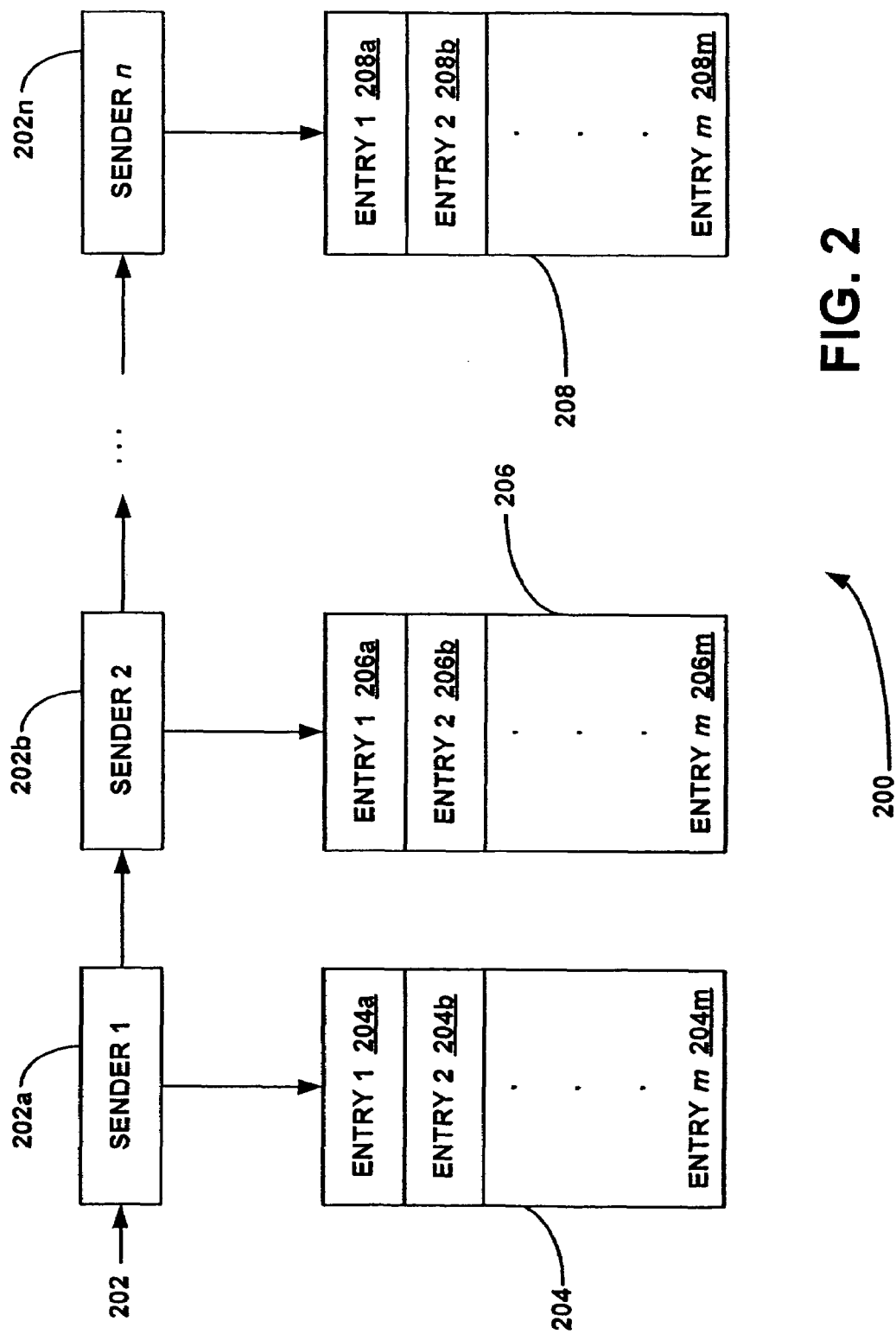
FIG. 2 is a diagram of a number of sender-specific lists of folders into which email have most recently been moved.

In the initial state 102, sender-specific lists of folders for email are initialized. FIG. 2 shows a diagram 200 of these sender-specific folder lists 202. Each list 202a, 202b, . . . , 202n is specific to a particular sender of email that has been received. Each of the lists 202 has a number of entries that correspond to folders into which email from a sender has been moved. The entries are preferably sorted by how recent email from the sender has been moved into the folders. For example, the first entry in each list corresponds to the most recent folder into which an email from the sender has been moved, the second entry to the second most recent folder into which an email from the sender has been moved, and so on. The list 202a has entries 204, and more specifically the entries 204a, 204b, . . . , 204m. The list 202b has entries 206, and more specifically the entries 206a, 206b, . . . 206m. Likewise, the list 202n has entries 208, and more specifically the entries 208a, 208b, . . . 208m. Alternatively, the lists 202 can have an unlimited number of entries.

The initialization of the sender-specific lists of folders for email of the initial 102 can be accomplished in one of two ways. First, the entries of the lists can be initialized as empty. As email from senders are subsequently moved to folders, the entries of the lists are then populated with entries corresponding to the folders. Second, the entries of the lists can be initialized based on how email from the senders are currently organized into folders.

Figure 3:
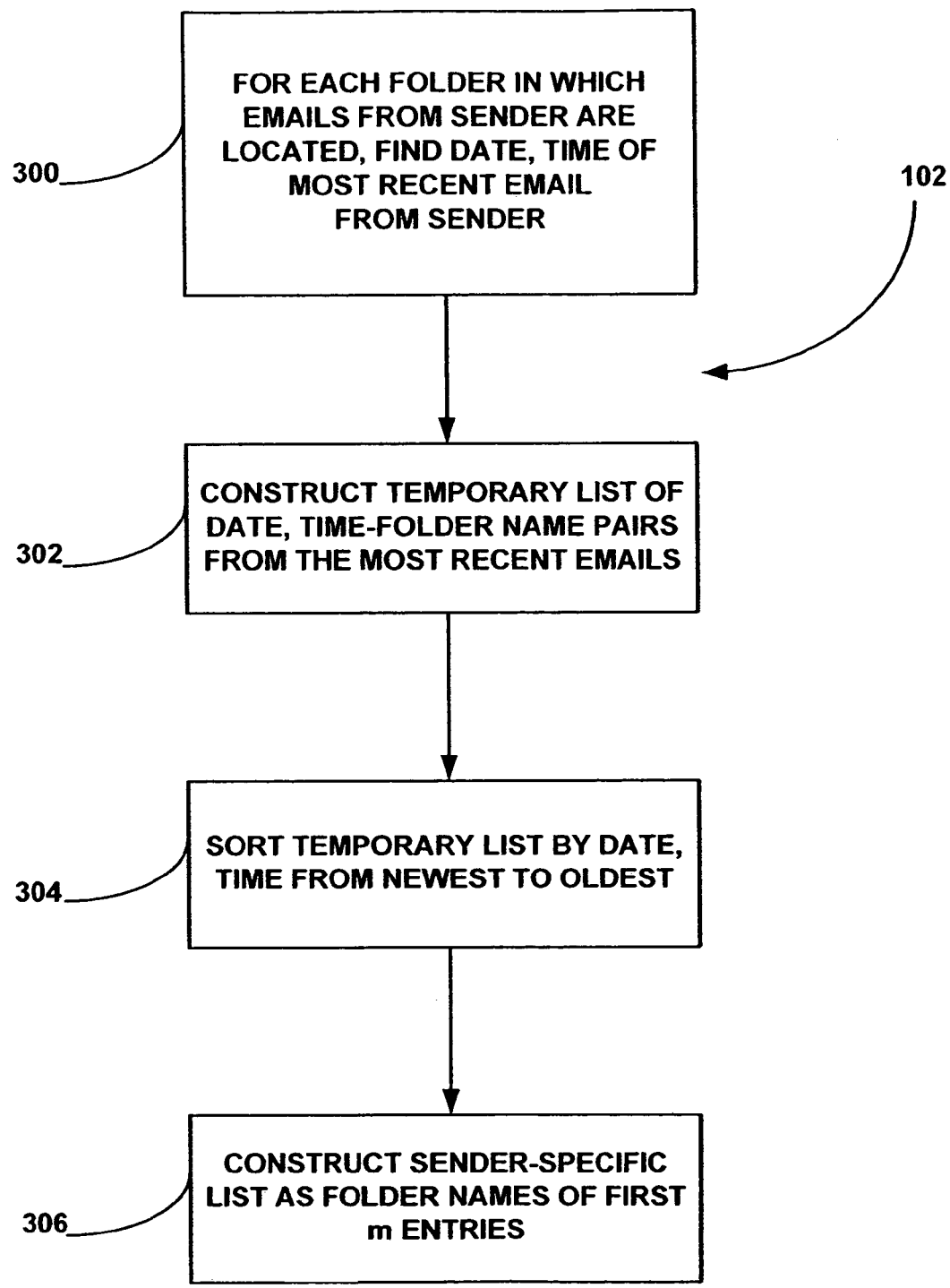
FIG. 3 is a flowchart of a method that one embodiment performs to initialize the sender-specific lists of folders.

This latter approach is shown in the flowchart of FIG. 3, in which the initial state 102 is performed as a method. 300, 302, 304, and 306 are performed for each sender-specific list. For each folder in which email from the sender corresponding to a list is located, the date and time of the most recent email are found (300). Next, a temporary list of date/time-folder name pairs is constructed from these email (302), which is then sorted by date and time from newest to oldest (304). That is, the list is sorted by date and time from most recent to least recent. The sender-specific list is constructed as the folder names of the first m entries of the temporary list (306). The initialization of FIG. 3 implicitly assumes that email that have been received most recently have been most recently moved to the folders in which they currently reside. While this assumption is not necessarily correct under all circumstances, it is useful for initially populating the entries of the sender-specific lists.

Referring back to FIG. 1, the initial state 102 transitions to the update state 104 when a current email is moved, as indicated by the arrow 108. The update state 104 is also transitioned to from the display state 106, and from the update state 104 itself, as indicated by the arrows 116 and 110, respectively. In the update state 104, the sender-specific list corresponding to the sender of the current email that has been moved to a new folder is updated to reflect this movement.

Figure 4:
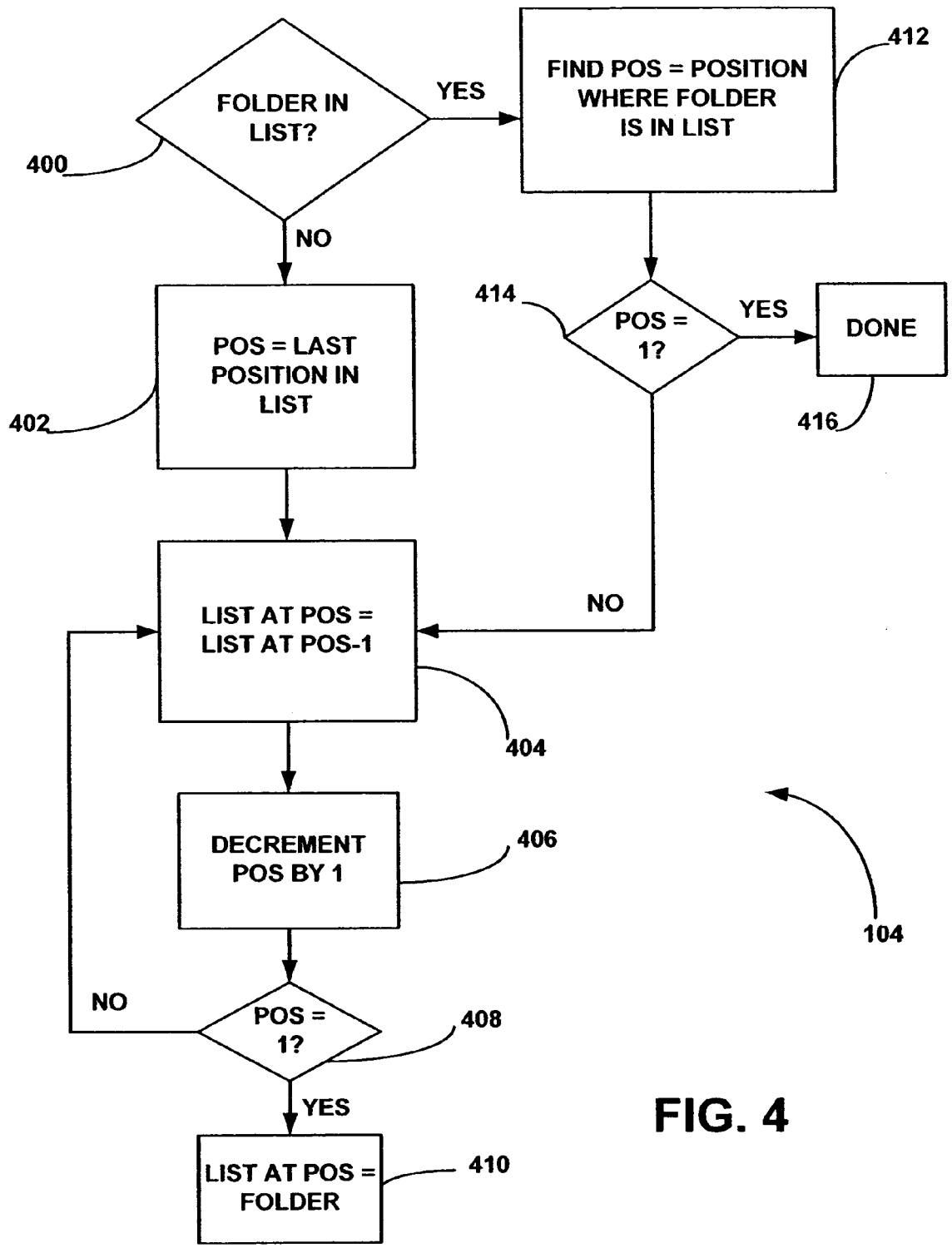
FIG. 4 is a flowchart of a method that one embodiment performs to update a sender-specific list when an email from the sender corresponding to the list has been moved into a new folder.

This updating of a sender-specific list is shown in the flowchart of FIG. 4, in which the update state 104 is performed as a method. If the folder into which the current email has been moved is already in the sender-specific list corresponding to the sender of the current email (400), then this entry is located (412). The entry is located as a number corresponding to the entry position in the list, where one corresponds to the first entry, two corresponds to the second entry, and so on. The entry position is referred to as the variable POS in FIG. 4. If the entry is the first entry in the list (414), then the method is finished (416). This is because the first entry corresponds to the most recent folder to which an email from the sender has been moved. Where the current email from the sender has also been moved to this folder, the list does not need to be updated. If the folder into which the current email has been moved is not already in the list (400), then the entry is set as the last entry in the list (402), and is also referred to as the variable POS in FIG. 4.

Where the folder into which the current email has been moved is not already in the list, or is in the list but not at the first entry, the method proceeds to copy the folder of the current list entry to be identical to the folder of the previous list entry (404). For example, in the former case, where the entry has been set as the last entry in the list, the folder of the last entry is made identical to the folder of the next-to-last entry. In the latter case, the entry has been set as any of the entries in the list except for the first entry. Therefore, the folder of this entry is made identical to the folder of the entry immediately preceding this entry. Next, the entry position is decremented by one (406). If the entry position now corresponds to the first entry in the list (408), the method ends by setting the first entry to the folder into which the current email has been moved (410). Otherwise, the method repeats 404, 406, and 408 until the entry position corresponds to the first entry in the list.

The method of FIG. 4 assumes that the data structure for the list is implemented as an array. However, the list may be implemented as other types of data structures as well. For example, the list may be implemented as a linked list data structure.

Figure 5:
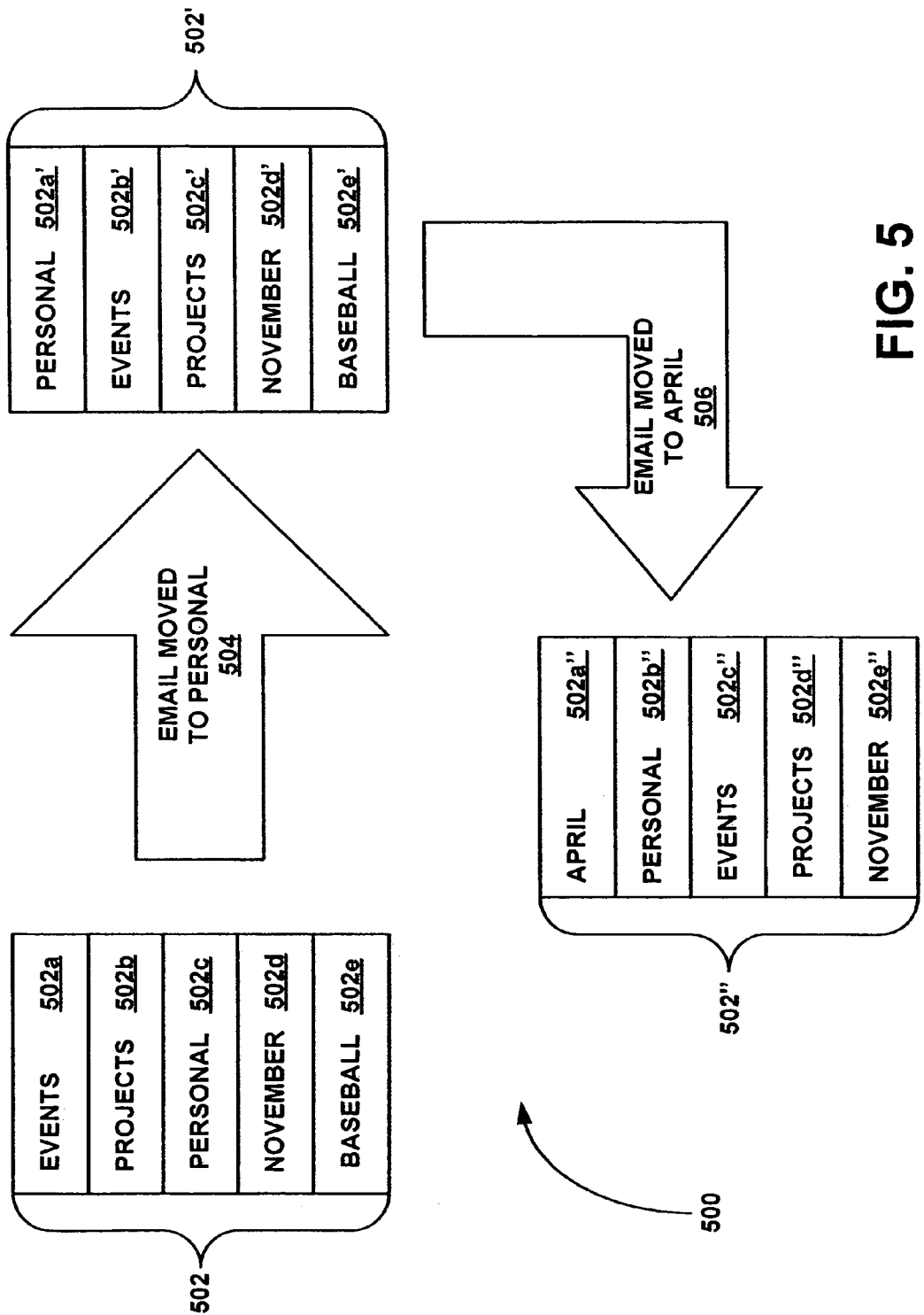
FIG. 5 is a diagram showing the operation of the method of FIG. 4 against an example sender-specific list of folders.

An example of the operation of the method of FIG. 4 is shown in the diagram 500 of FIG. 5. The sender-specific list 502 has five entries 502a, 502b, 502c, 502d, and 502e, corresponding to the folders "events," "projects", "personal," "November," and "baseball," respectively. When an email from the sender corresponding to the list 502 is moved to the folder "personal," as indicated by the arrow 504, the sender-specific list 502 is updated as the list 502'. The sender-specific list 502' has five entries 502a', 502b', 502c', 502d', and 502e', corresponding to the folders "personal," "events," "projects," "November," and "baseball," respectively. Note that the folder "personal" has been moved up from the entry 502c in the list 502 to the first entry 502a' in the list 502'. This is because an email from the sender has been most recently moved to the folder "personal." The folders "events" and "projects," which occupy entries 502a and 502b in the list 502, have been moved down one entry to occupy entries 502b' and 502c' in the list 502'. Entries 502c', 502d', and 502e' of the list 502' still correspond to the same folders as do entries 502c, 502d, and 502e of the list 502.

When an email from the sender corresponding to the list 502' is moved to a folder not already in the list 502', such as the folder "April," as indicated by the arrow 504, the sender-specific list 502' is updated as the list 502". The sender-specific list 502" has five entries 502a", 502b", 502c", 502d", and 502e", corresponding to the folders "April," "personal," "events," "projects," and "November," respectively. The folders "personal," "events," "projects," and "November," which occupy entries 502a', 502b', 502c', and 502d' in the list 502', have been moved down one entry. They now occupy entries 502b", 502c", 502d", and 502e" in the list 502". The folder "baseball," which occupies the entry 502e' in the list 502', has fallen off the list, and does not occupy any entry in the list 502". The folder "April" into which an email from the sender has been most recently moved, occupies the first entry 502a" of the list 502".

The example of FIG. 5 assumes that each list has only five entries, corresponding to five different folders. This is for example purposes only. For a given implementation, the lists can have different numbers of entries. For example, in an alternative embodiment, each list may have ten entries. Furthermore, the lists themselves may not be limited to any particular number of entries, but when a list is to be displayed, only a first number of entries of the list are displayed. For example, a list may currently have ten entries, but the number of entries may increase as folders are added to the list. However, when the list is displayed, only the first five entries may be shown, regardless of the number of entries within the list.

Referring back to FIG. 1, the initial state 102 transitions to the display state 104 when a sender-specific list is moved, as indicated by the arrow 114. The display state 106 is also transitioned to from the update state 104, and from the display state 106 itself, as indicated by the arrows 112 and 118, respectively. In the display state 106, a sender-specific list of folders is displayed. The user can then select a folder into which to move a current email from the displayed list.

Figure 6:
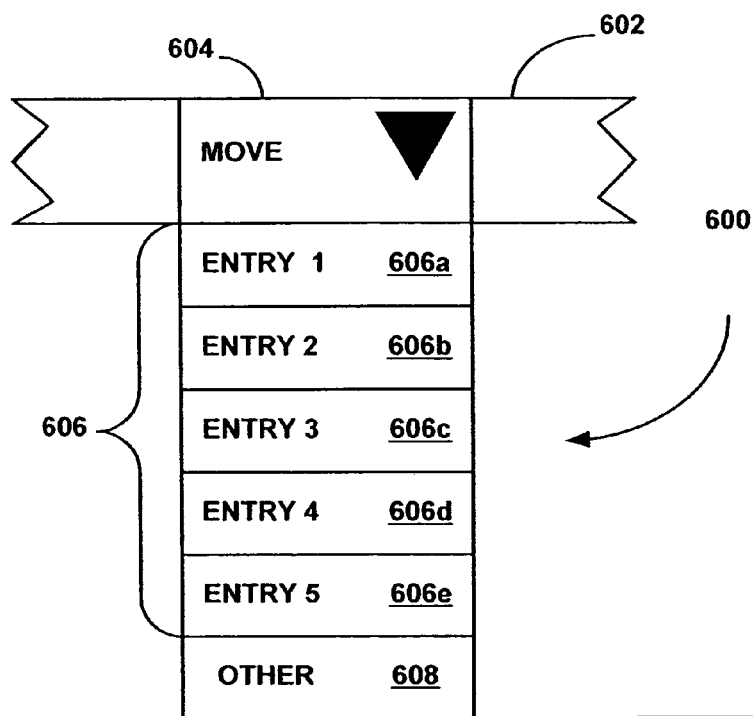
FIGS. 6 and 7 are diagrams of graphical user interface elements according to which embodiments of the invention can display a sender-specific list of folders.

The invocation of a sender-specific list to cause displaying of the list in the display state 106 can be accomplished in at least two ways. First, for a current email that has been selected, the user may manually perform an action to cause the list corresponding to the sender of the email to be displayed. That is, the user provides an indication that he or she wishes to view the sender-specific list. For example, within a graphical user interface, the user may move a pointer using a mouse over a specific button and press a mouse button to cause the list to be displayed. This is shown in the diagram 600 of FIG. 6. The toolbar 602 is a graphical user interface element that can include a number of buttons, such as the move button 604. When the user positions the pointer (not shown) using the mouse over the button 604, and presses the mouse button, the list 606 drops down and is displayed. The list 606 has entries 606a, 606b, 606c, 606d, and 606e, which correspond to the folders into which email from the sender has been most recently moved. If the user wishes to move the current email to a different folder not in the list 606, the user can select the "other . . . " item 608, which would cause all the folders to be displayed.

Figure 7:
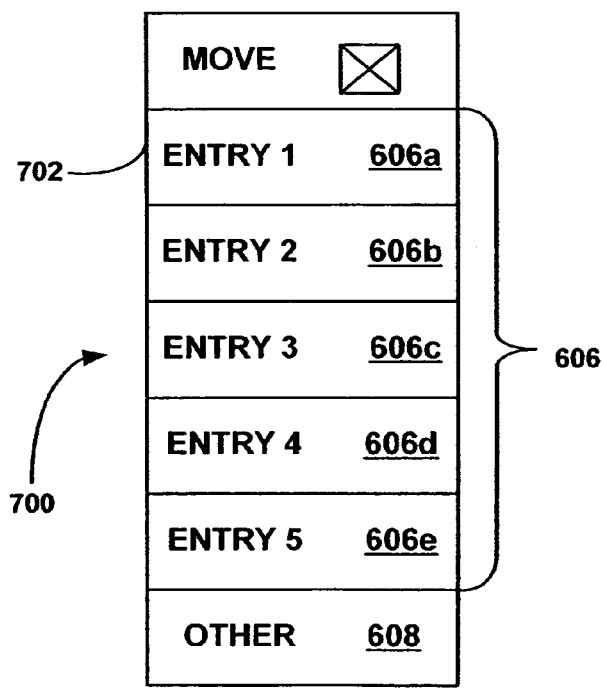

Second, for a current email that has been selected, the sender-specific list corresponding to the sender of the email may automatically be displayed. That is, when it is detected that an email has been selected, indication is made to automatically display the sender-specific list. For example, within a graphical user interface, there may be a window that is always on top of other windows in which the list is displayed. This is shown in the diagram 700 of FIG. 7, in which the list 606 is displayed in the window 702, as well as the "other . . . " item 608.

Combining sender-specific and general most-recently-moved-to lists

The lists displayed in the display state 106 of FIG. 1 have been described as the sender-specific lists of folders to which email from senders have most recently been moved. Alternatively, the lists displayed in the display state 106 can combine the sender-specific lists with a general, non-sender-specific list of folders to which email from senders have most recently been moved. This can be accomplished in at least two ways. First, the non-sender-specific list of folders can be simply appended to a sender-specific list, or vice-versa. For example, where the sender-specific lists and the non-sender-specific list each has five entries, a combined list of ten entries can be displayed. The first five entries of the combined list may come from a sender-specific list, whereas the last five entries of the combined list may come from the non-sender-specific list. Duplicate entries are removed prior to displaying the combined list.

Second, the entries of a sender-specific list and the entries of the non-sender-specific list can be sorted. For example, the entries can be sorted by how recent email from the sender corresponding to the first list have been moved to the folders of the first list, and how recent email corresponding to the second list have been moved to the folders of the second list. Duplicate entries in the combined list are removed, and the combined, sorted list is displayed. This sorted list is one type of combined list that is referred to generally as an integrated list, In an integrated list, the entries of the sender-specific list and the entries of the non-sender-specific list are not appended to one another, but instead are integrated according to some criterion to yield the combined list. The criterion can be, for instance, sorting the entries as has been described.

Using the sender-specific lists in conjunction with a find command

The sender-specific lists have been described as being displayed in the display state 106 of FIG. 1 to show to the user folders from which the user can select a folder into which to move a current email. Alternatively, displaying the folders in a sender-specific list can be invoked for other purposes. For example, a user may wish to invoke a find command to find all the email from a given sender. In addition to or in lieu of showing the user all the email from this sender, an alternative embodiment may show the user the sender-specific list of folders corresponding to the sender. In this way, the user views the folders into which email from the sender have been most recently moved. The user may select one of the folders to view the email in this folder, to see if the email the user is looking for is in the folder.

Other objects, actions, controlling attributes, and sort criteria

The invention has been described such that sender-specific lists are maintained in which entries correspond to the folders into which email from senders have been most recently moved. Email in this case is one type of object. Movement of email into folders is one type of action. The sender of the email according to which specific lists are maintained is one type of controlling attribute. Finally, the list entries corresponding to the folders to which email have been most recently moved is one type of sort criterion for the lists. Alternatively, other types of objects, actions, controlling attributes, and sort criteria can be used.

For example, instead of objects that are email, the objects can be files, such as word processing files, spreadsheet files, and other types of computer files. The action in this case may be the movement of the files into folders, where the specific lists are maintained according to the creators of the folders as the controlling attribute. The list entries corresponding to the folders to which files have been most recently moved can be the sort criterion.

As another example, the recipient of the email, instead of the sender of the email, may be the controlling attribute according to which the specific lists are maintained. Rather than the movement of objects into folders, the setting of properties of the objects may be the action. For example, for email, a given email may have a priority property set to high, medium, or low, such that these priority levels are maintained in the controlling attribute-specific lists.

Furthermore, other sort criteria can be used. Rather than a most-recently-moved-to (MRMT) sort criterion, a most-frequently-moved-to (MFMT) sort criterion may be used. The controlling-attribute specific lists in this case include the folders to which objects have been most frequently moved to, as opposed to most recently moved to. This criterion focuses on the number of times an object having a particular controlling attribute has been moved to a folder, as opposed to how recent an object having the controlling attribute has been moved to a folder.

An MFMT sort criterion can alternatively be combined with the MRMT sort criterion. For each sender-specific folder i, there is a probability $p_i$ that an email will be moved into the folder, such that for all the folders n, $$\sum_{i=1}^{n} P_i = 1$$

Furthermore, for each folder i, the number of email from the sender corresponding to the folder is $c_i$. This email count may be based over a time interval t, or based on the previous k messages received from the sender corresponding to the folder. To combine the lists, the highest r probability folders can be appended to the highest s count folders, or vice-versa. Alternatively, the probabilities and the counts can be integrated as:

$$d_i = \frac{P_i}{\alpha} + \left(1 - \frac{1}{\alpha}\right)\frac{C_i}{n} \quad (1)$$

In the equation (1), $d_i$ for each sender-specific folder i is the combined probability and count for that folder, and $\alpha$ is a weighting constant. The m folders with the highest $d_i$ are then displayed as the combined count and probability lists. Where the weighting constant $\alpha$ is greater than or equal to 1, then $$\sum_{i=1}^{n} d_i = 1,$$

the current value for $p_i$ can be periodically set to $d_i$. This may be done periodically to adjust the $p_i$ values.

Example System for Implementing the Invention

Figure 8:
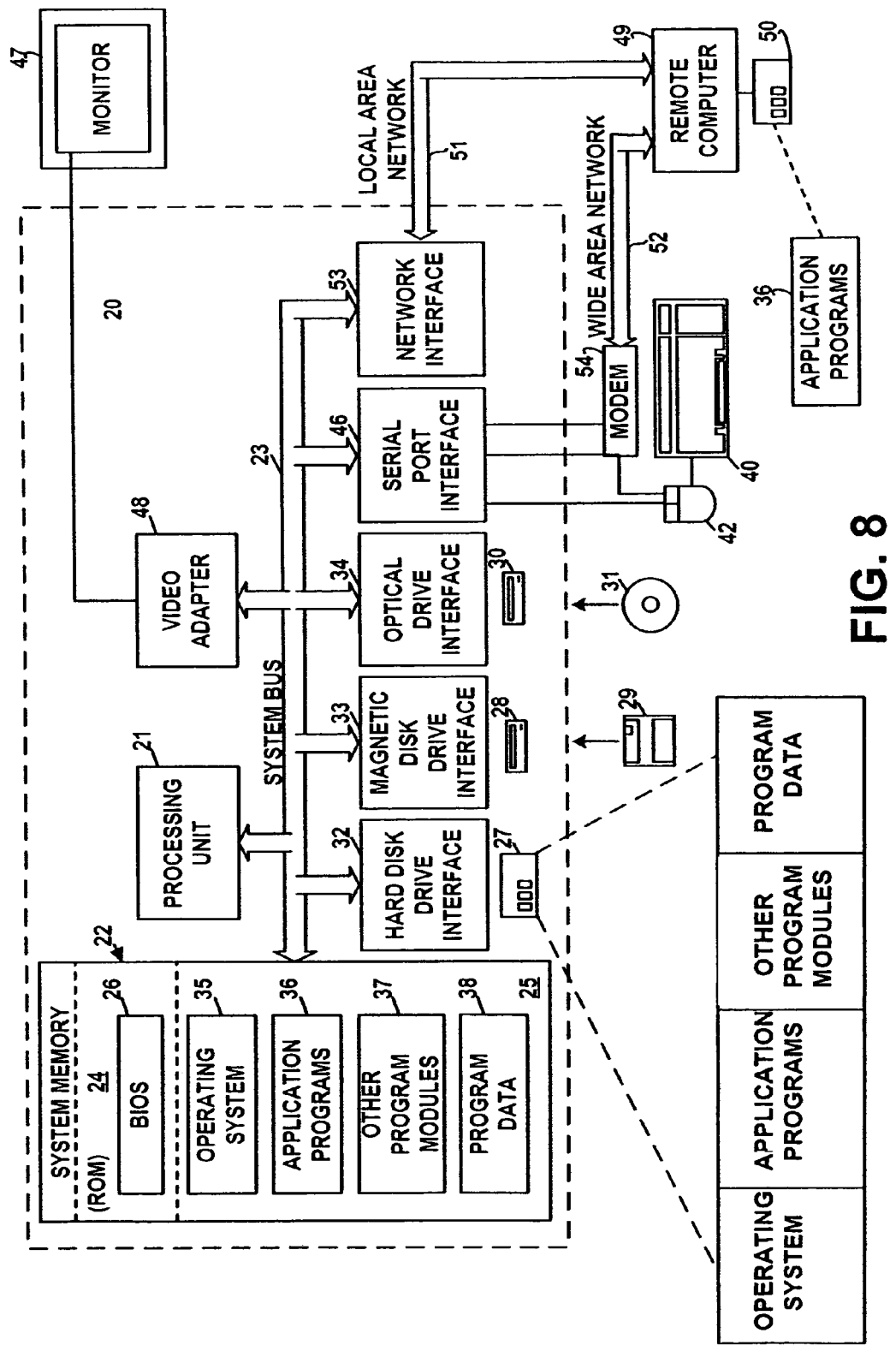
FIG. 8 is a diagram of an example system in conjunction with which the invention may be implemented.

The invention can be implemented within a computerized environment having one or more computerized devices. The diagram of FIG. 8 shows an example exemplary system for implementing the invention that includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25.

A basic input/output system (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in Figure The logical connections depicted in Figure include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The state diagrams that have been described can be implemented as methods. These and other methods that have been described can be computer-implemented. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A method for assisting object organization comprising:
    initializing a plurality of attribute-specific lists, each list having a defined association with a different controlling attribute and having a plurality of entries corresponding to selectable actions to be performed on an object having the associated controlling attribute, the selectable actions ordered from a most recently performed action to a least recently performed action with respect to an object having the associated controlling attribute;
    invoking a first of the plurality of attribute-specific lists via a first object having a first controlling attribute, the first attribute-specific list associated with the first controlling attribute;
    selecting an action from the first attribute-specific list to be performed on the first object;
    reordering the first of the plurality of attribute-specific lists in accordance with the selected action, the reordering of the first of the plurality of attribute-specific lists performed independently of the remaining attribute-specific lists;
    integrating a general list with the first of the plurality of attribute-specific lists to define an integrated list, the general list having a plurality of entries and further not being associated with the controlling attribute of the first of the plurality of attribute-specific lists, with the integrated list being sorted by a criterion such that the general list is not appended to the first of the plurality of attribute-specific lists;
    invoking a second of the plurality of attribute-specific lists via a second object having a second controlling attribute, the second attribute-specific list associated with the second controlling attribute;
    selecting an action from the second attribute-specific list to be performed on the second objection;
    reordering the second of the plurality of attribute-specific lists in accordance with the selected action, the reordering of the second of the plurality of attribute-specific lists performed independently of the remaining attribute-specific lists;
    invoking the reordered first of the plurality of attribute-specific lists via a third object having the first controlling attribute; and
    invoking the reordered second of the plurality of attribute specific lists via a fourth object having the second controlling attribute.

2. The method of claim 1, wherein each of the first, second, third, and fourth objects corresponds to an email.

3. The method of claim 2, wherein the controlling attribute of each of the first, second, third, and fourth objects corresponds to a sender of the email.

4. The method of claim 1, wherein each of the first, second, third, and fourth objects corresponds to a file.

5. The method of claim 4, wherein the controlling attribute of each of the first, second, third, and fourth objects corresponds to a creator of the file.

6. The method of claim 1, wherein the action is movement to a folder.

7. The method of claim 1, wherein the action is setting an object property.

8. The method of claim 1, wherein the sort criterion is how recently the listed alternatives have been performed.

9. The method of claim 1, wherein the method is performed by execution of a computer program by a processor from a computer-readable medium.

10. The method of claim 1, wherein the criterion is time based.

11. A method for dynamically maintaining and displaying attribute-specific lists comprising:
    initializing a set of attribute-specific lists, each attribute-specific list having a defined association with an object attribute and listing selectable actions to be performed on an object having the associated object attribute, wherein the controlling attribute is based on a creator of the object;
    updating a first of the attribute-specific lists based on an action performed on an object containing the attribute associated with the first of the attribute-specific lists, the update performed independently of the remaining lists in the set of attribute-specific lists;

displaying the updated attribute-specific list via a disparate object containing the same attribute; and integrating a general list with the first of the plurality of attribute-specific lists to define an integrated list, the general list having a plurality of entries and further not being associated with the controlling attribute of the first of the plurality of attribute-specific lists, with entries of the integrated list being sorted by a criterion other than a source of the entries.

12. The method of claim 11, the selectable actions listed in the attribute-specific list comprising folders.

13. The method of claim 11, the attribute-specific lists initialized to be empty.

14. The method of claim 11, the object attributes comprising types of computer files.

15. The method of claim 11, the set of attribute-specific lists initialized based on a controlling attribute.

16. The method of claim 11, wherein the controlling attribute is based on at least the recipient of the object.

17. The method of claim 11, further comprising sorting the attribute-specific lists based on at least one sort criterion.

18. The method of claim 17, the sort criterion corresponds to a level of priority.

19. The method of claim 17, the sort criterion corresponds to a time at which the object having the associated attribute was subject to the action.

20. The method of claim 17, the sort criterion corresponds to a frequency to which the object having the associated attribute is subject to the action.

21. The method of claim 11, further comprising appending additional selectable actions to an existing attribute-specific list.

22. The method of claim 11, the action corresponds to movement of at least one object between attribute-specific lists.

23. The method of claim 11, the object corresponds to email.

24. The method of claim 11, wherein the action corresponds to setting a property on at least one object.

25. A system comprising computer-executable instructions embodied on a computer-readable storage medium that when executed on one or more processors facilitate dynamic object organization, comprising:

an initializing component that initializes a plurality of attribute-specific lists, each attribute-specific list having a defined association with one or more controlling attributes, the one or more controlling attributes based at least on a creator of the object;

an updating component that reorders a first of the plurality of attribute-specific lists based on a function performed on a first object having the associated one or more controlling attributes;

a display component that displays the reordered first of the plurality of attribute-specific lists via a second object containing the same one or more controlling attributes; and an integrating component that integrates a general list with the first of the plurality of attribute-specific lists to define an integrated list, the general list having a plurality of entries and further not being associated with the controlling attribute of the first of the plurality of attribute-specific lists, with entries of the integrated list being sorted by a criterion other than a source of the entries.

26. The system claim of 25, entries in each of the plurality of attribute-specific lists comprise folders.

27. The system claim of 25, the plurality of attribute-specific lists initialized to be empty.

28. The system claim of 25, the one or more controlling attributes comprising types of computer files.

29. The system claim of 25, the first and second objects comprising email.

30. The system claim of 25, the one or more controlling attributes based on at least the recipient of the object.

31. The system claim of 25, further comprising a sorting component.

32. The system claim of 31, the sorting component utilizing one or more sort criteria.

33. The system claim of 32, the one or more sort criteria based at least on a level of priority.

34. The system claim of 32, the one or more sort criteria based at least on the time at which the object was subject to the function.

35. The system claim of 32, the one or more sort criteria based at least on the frequency to which the object was subject to the function.

36. The system claim of 25, further comprising an appending component to append one or more additional entries to the plurality of attribute-specific lists.

37. The system claim of 36, the appending component utilizing the one or more controlling attributes to append the one or more additional entries to the plurality of attribute-specific lists.

38. The system claim of 25, the function being movement of at least one object to a selected location.

39. The system claim of 25, the function being setting at least one property on the object.

40. A system comprising computer-executable instructions embodied on a computer-readable storage medium that when executed on one or more processors aid dynamic object organization, comprising:

means for initializing a set of attribute-specific lists based on at least one controlling attribute, the one or more attribute-specific lists orderable based on one or more ordering criteria, each attribute-specific list having a defined association with a different controlling attribute and comprising attribute-specific entries representing actions that have recently been performed on objects having the associated attribute;

means for updating a first of the attribute-specific lists based on an action performed on an object having the controlling attribute associated with the first attribute-specific list;

means for reordering the first of the attribute-specific lists based on the one or more ordering criteria, the ordering criteria is a function of the performed action;

means for integrating a general list with the first of the plurality of attribute-specific lists to define an integrated list, the general list having a plurality of entries and further not being associated with the controlling attribute of the first of the plurality of attribute-specific lists, with entries of the integrated list being sorted by a criterion other than a source of the entries means for subsequently displaying the integrated list via a second object having the same controlling attribute.

* * * * *